(12) United States Patent
Tilfors et al.

(10) Patent No.: US 7,533,052 B2
(45) Date of Patent: May 12, 2009

(54) TRADING SYSTEM

(75) Inventors: Jan Tilfors, Bromma (SE); R. Derek Bandeen, London (GB)

(73) Assignee: OM Technology AB, Stockholm (SE)

( * ) Notice: Subject to any disclaimer, the term of this patent is extended or adjusted under 35 U.S.C. 154(b) by 1171 days.

(21) Appl. No.: 10/212,738

(22) Filed: Aug. 7, 2002

(65) Prior Publication Data

US 2004/0030630 A1    Feb. 12, 2004

Related U.S. Application Data

(63) Continuation of application No. PCT/SE01/00233, filed on Feb. 7, 2001.

(30) Foreign Application Priority Data

Feb. 7, 2000    (SE) .................................. 0000385

(51) Int. Cl.
G06Q 40/00    (2006.01)
G06Q 20/00    (2006.01)
G06Q 30/00    (2006.01)

(52) U.S. Cl. ............................. 705/37; 705/26; 705/20; 705/35

(58) Field of Classification Search .................. 705/37, 705/26, 20, 35
See application file for complete search history.

(56) References Cited

U.S. PATENT DOCUMENTS

| | | | |
|---|---|---|---|
| 5,375,055 A | 12/1994 | Togher et al. | |
| 5,963,923 A | 10/1999 | Garber | |
| 6,014,627 A | 1/2000 | Togher et al. | |
| 6,278,982 B1 * | 8/2001 | Korhammer et al. | 705/36 R |
| 6,321,212 B1 * | 11/2001 | Lange | 705/36 R |
| 6,405,180 B2 * | 6/2002 | Tilfors et al. | 705/36 R |
| 6,618,707 B1 * | 9/2003 | Gary | 705/36 R |
| 2001/0056393 A1 * | 12/2001 | Tilfors et al. | 705/37 |

FOREIGN PATENT DOCUMENTS

| | | |
|---|---|---|
| WO | WO 93/15467 | 8/1993 |
| WO | WO 98/38844 | 9/1993 |
| WO | WO 9708640 A1 | 12/1994 |
| WO | WO 00/28450 | 5/2000 |

OTHER PUBLICATIONS

Unknown, New Riverside University Dictionary, 1988, Houghton Mifflin Company, p. 121.*
Stephen A. Ross, Fundamentals of Corporate Finance, 1995, Richard D. Irwin, Inc. Third Edition, pp. 686-695.*
John Downes, Barron's Dictionary of Finance and Investment Terms, 1998, Barron's, Fifth Edition, p. 581.*
Mark Malyszko, Compliance clarified: Best execution, Aug. 31, 1998, Compliance Reporter, vol. 5 Issue 18, p. 7.*
Schmerken, "The Pandora's Box Over Autoquotes," Wall Street & Technology, V15, N3, p. 38(3), Mar. 1997.
Schmerken, "The Bulls and Bears Come Out at Night; Electronic Trading", Wall Street Computer Review, V7, N12, p. 14(9), Sep. 1990.
Sales, "Play Fair with the Little Guy." Wall Street & Technology, V15, N1, p. 42(5), Jan. 1997.

* cited by examiner

Primary Examiner—James P. Trammell
Assistant Examiner—Scott Trotter
(74) Attorney, Agent, or Firm—Nixon & Vanderhye P.C.

(57) ABSTRACT

In an automated exchange system functions for automatic hedging and automatic price improvements are provided.

24 Claims, 3 Drawing Sheets

TRADING SYSTEM

RELATED APPLICATION

This application is a continuation of international application PCT/SE01/00233, filed 7 Feb., 2001, which designates the U.S. and claims foreign priority from Swedish application 0000385-5, filed 7 Feb. 2000.

TECHNICAL FIELD

The present invention relates to an automatic exchange system, and in particular to the management of market maker quotes in such a system.

BACKGROUND

When designing automated exchange systems there is a constant demand for improvements, which increase liquidity, narrows the difference between bid and offer, the so called spread, and reduce the risk exposure for parties involved in the trading of instruments at the automated exchange.

For example, if prices on the market are changing the parties probably want to change their quotes. It is then of great importance that the changes can be made very quickly in order not to expose the parties involved to an unnecessary high risk. If changes can be made quickly the spread can be kept at a minimum and market makers or any other type of trader can accept the risk of placing orders in the order book.

Furthermore, a market maker has an obligation to quote, i.e. to have both a bid and an ask in the market most of the time during trading. When the market moves this obligation results in a requirement on the market maker to send new quotes to the exchange. If the same firm or person (or automatic quoting system) is a market maker in many instruments this will create a problem for the market maker. Hence, when the market moves fast a lot of quotes need to be sent. The result may be that the market maker needs to have a larger spread, i.e. the difference between the bid and the ask, in order to decrease the risk of not being able to re-quote fast enough to an acceptable level.

An efficient matching system should also have functionality to always do a best price available check before an order from a customer is matched. Also the customer order should be sent to another market, if the other market has a better price and the market maker can/do not want to do a price improvement. The International patent application No. PCT/SE99/01995 describes an automatic exchange system where, if an order can not match due to a best price checking functionality in the system, the order can automatically be sent to another exchange, where a better price is available.

SUMMARY

It is an object to provide an improved automatic exchange system where market makers can change quotes more quickly and exposing themselves to a lower risk and at the same time keep a low spread.

It is also an to provide the market maker with a new function for automatic hedging. The function is used by the market maker to hedge in another market and then trade a customer order when the other market has a better price.

Thus, when an order is entered into the system, i.e. an incoming order, the system will electronically, using a computer, ensure that the order is traded at the best possible price using the following steps:

First, the system creates a list, sorted by price, of all offers (if the incoming order is to buy) or bids (if the incoming order is to sell) for the same security on the Exchange at that time, which are within the price limit (if any) specified in the incoming order is to sell) for the same security on the Exchange at that time, which are within the price limit (if any) specified in the incoming order. Such a list is hereinafter termed the "Bid/Offer List". The Bid/Offer List will comprise any ordinary limit orders in the order book at that time, as well as any quote given by the market maker for that particular instrument.

The system will then proceed to match the incoming order against the bids/offers in the Bid/Offer List. The order will first be matched with the best bid/offer in the Bid/Offer List, provided that this is equal to or better than the best bid offer on the designated exchange, i.e. the exchange to which the market maker sends quotes. Any unfilled balance of the order will then be matched against the second best bid/offer in the Bid/Offer List; and so on. This will continue until either the price limit given in the incoming order would be exceeded, or until the next bid/offer in the Bid/Offer List would be inferior to the best bid/offer given on the designated exchange as identified by the System at that time. In this matching process, multiple bids/offers at the same price will preferably be given priority based on time ranking.

However, ordinary limit orders in the order book preferably always have priority over a market maker quote at the same price, regardless of their relative time ranking.

If the entire order has not been filled following completion of these steps, the market maker according to an example embodiment must either:

(i) trade in an amount equal to the volume indicated in the designated exchange best bid offer less the volume already executed at the price indicated in the designated exchange best bid offer (provided this price is within any price limit specified in the incoming order) and then trade the remaining unexecuted balance of the incoming order, if any, at "one tick worse" than the price indicated in the designated exchange best bid offer (provided this price is within any price limit specified in the incoming order); or (ii) (where the market maker wishes to pre-hedge) submit an order to the designated exchange for a size equal to the remaining unfilled balance of the original order.

The System will be able to automatically check which of these options the market maker would like to select by reference to trading parameters provided by the market maker throughout the trading session.

If the market maker order is executed on the designated exchange, the market maker is in a preferred embodiment obliged to enter into a transaction (or transactions if the market maker order was filled in parts) with the system. The transactions are preferably executed using the trading rules of the system at the same price (or prices) at which the market maker order was executed and for the same volume (or volumes). The corresponding incoming order will be filled accordingly. If the market maker order cannot be executed on the Designated Exchange, the incoming order will lapse.

Limit orders will be executed in the same way as fast orders except that if a limit order is not immediately, executed in whole in accordance with the procedures set out above, the order (or any balance remaining) will rest in the order book. The order will remain in the order book until it can be executed, or until the end of the trading day, at which time any remaining balance will lapse. Where two limit orders or a limit order and a fast order submitted by a trading party are matched by the system, a transaction will arise between the trading party who submitted one of the orders and the system.

Also, another transaction will arise between the trading party who submitted the other order and the system.

Trading of shares will take place during the trading session for such shares: initially this will be only during the hours in which trading can take place in such shares on the relevant designated exchange. Prior to the opening of a trading session, the relevant market maker may input quotes during the pre-opening session. Preferably, no trading party orders may be submitted during the pre-opening session. Once the trading session is opened for trading a share, trading parties or market makers may submit orders.

DETAILED DESCRIPTION

In order make it possible for a market maker to set a quote without having to set a price the following steps are performed in an automated exchange system.

Figure 1:
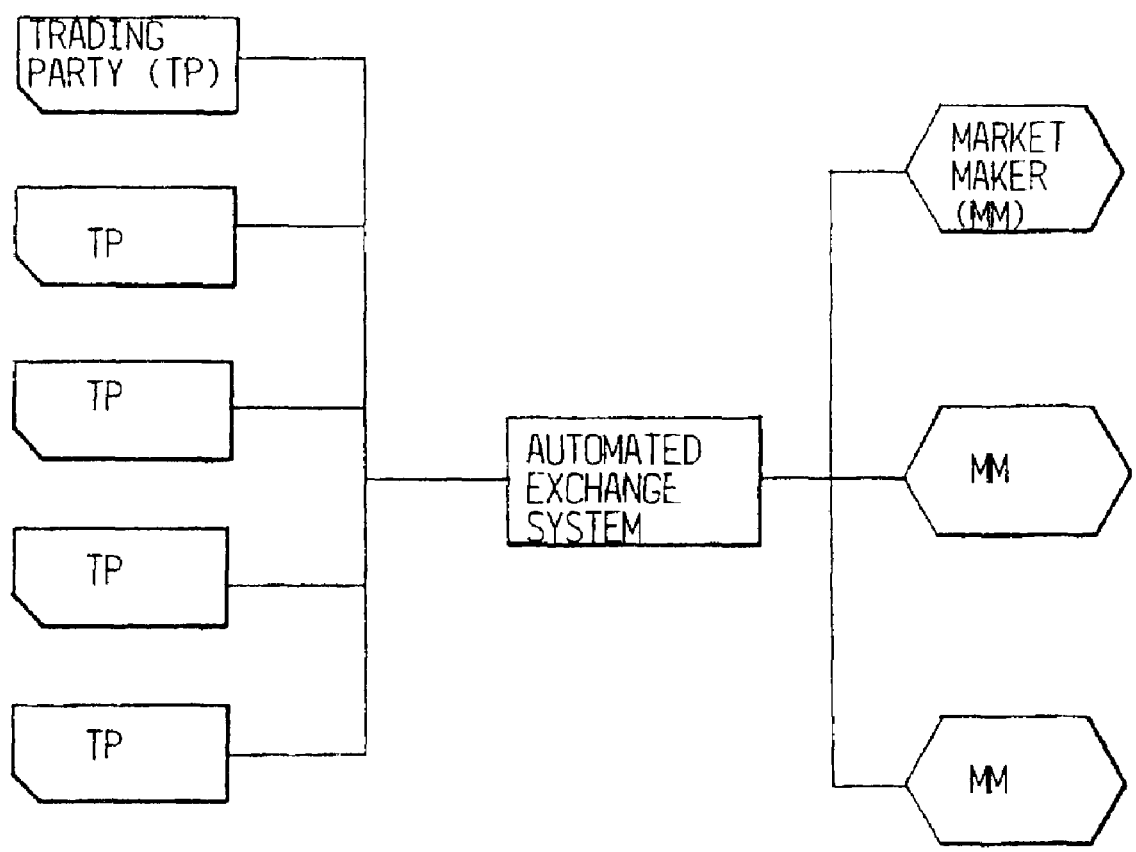
FIG. 1 is a general view of an automated exchange system.

In the automated exchange system as shown in FIG. 1, having a number of parties connected thereto, such as customers and market makers, there are two types of market maker quotes. Both can be used at the same time in the same instrument. However, in most applications, only one of each type is used in the same instrument at the same time.

The market maker has the possibility to send price quotes to order book. A quote is preferably a bid or ask quote with an attached volume. It has the same functionality as ordinary limit orders.

Also, the market maker may use a price improvement quote, which automatically creates a quote when necessary. Using such a market maker price improvement quote will result in that the market maker does not need to provide a price to the exchange. Instead the market maker assumes to have the same price as the designated exchange. Thus, the market maker price improvement quote can only be used when the designated exchange open, since otherwise there is no price at the exchange. In the market maker price improvement quote the market maker preferably sets the following parameters:

Instrument identification
Bid volume multiplier
Bid volume limit
Offer volume multiplier
Offer volume limit
Where the parameters are defined as follows:
Bid (offer) volume multiplier—A multiplier specifying how many times the designated exchange volume the market maker is prepared to trade without hedging first. Note that the volume can be restricted by the Bid (offer) volume limit.
Bid (offer) volume limit—the maximum volume the market maker is prepared to trade without hedging first. When the quote is used in matching the Bid offer volume limit is decreased.

There is also preferably a possibility for exchange staff and for the market maker to retrieve the information from the order book using query functionality.

Below trading and matching is described when the designated exchange is open.

The market maker can preferably enter the following order types market maker price Quotes, and
market maker price improvement quotes as described above.

An incoming order tries to match with orders/quotes in the order book. If a match can not be done the order is rejected or stored in the order book.

An incoming order match with orders/quotes in the order book as long as the incoming order locks/cross with orders/quotes in the order book or the designated exchange best price. In case the incoming order has a better price (price cross) than orders/quotes in the order book, the price of the order/quotes in the order book is preferably used.

1. The incoming order matches with orders/quotes better than or equal to the designated exchange price.
2. In case there are volume to match of the incoming order and the competing exchange has a better price than the incoming order, the order tries to match with the market maker price improvement quote. The price improvement quote is a quote calculated as a total volume that the market maker is prepared to match directly. If the calculated volume is larger then the rest of the incoming order there is a match.

The execution prices are set as follows:
The same price as the best price of the designated exchange is used for the same volume at the designated exchange.

For the rest of the volume, the price is set one price tick worse using the designated exchange price ticks.

If the calculated volume is smaller than the remaining volume of the incoming order the market maker needs to hedge before trading the order. Hedging procedures are described below.

In case the hedging procedure has started other orders in the order book may trade.

The system preferably also has an automatic hedging function. Thus, there is a function for supporting creation of so called hedge orders. One or several market maker hedge orders are created and sent to the designated exchange. Hedge orders are preferably created using the following rules, where some steps are optional:

Hedge orders are preferably created as immediate or cancel orders.
Number and limit price of hedge orders is dependent on limit orders and price quotes in the order book. E.g. if the incoming order is a bid, the hedge orders created are depending on the limit orders/quotes on the offer side.
All orders on the offer side better then the incoming orders limit price are summarized per price tick. One hedge order per price tick is created.
If the incoming order has larger volume then the total volume in the order book, an order is created with the difference. The volume is set to the incoming orders limit price (a market order is created if the incoming order is a market order).
For each price tick level where there are orders in the order book better then the incoming orders limit price (starting with the worst) one order is created. The order created has the same volume as the orders in the order book at that price tick. The order created has one tick better price tick then the orders in the order book (using the designated exchange price tick structure).
In case the total volume of orders created exceeds the incoming orders volume to match, no more orders are created.

Orders are sent to the designated exchange in the order they are created. All orders are first created and then sent in sequence as fast as possible.

Once all hedge orders have been sent to the designated exchange and have resulted in responses (trade or reject) the procedure is as follows:

The incoming order is executed at the same prices and volumes as the market maker hedge orders where executed at.

In case there are volume left of the incoming order it executes against any other orders in the order book.

Any volume left of the incoming order is rejected (fast orders) or stored in the order book (limit orders)

Figure 2:
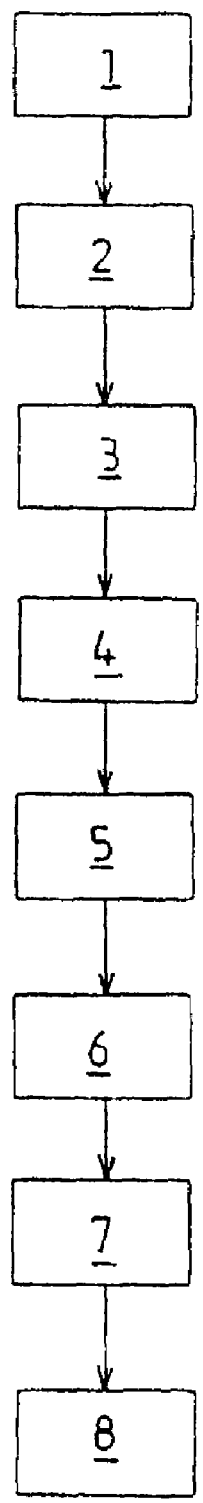
FIG. 2 is a flowchart illustrating steps carried out in the system according to a first example embodiment.
Figure 3:
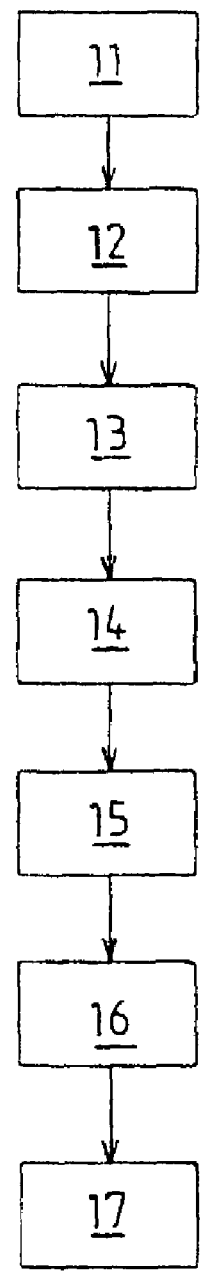
FIG. 3 is a flowchart illustrating steps carried out in the system according to a second example embodiment.

Below, an example of a trading action is described with reference to FIGS. 2 and 3, where it is assumed that a Customer ("TP") sends in a new order to buy (the "Order").

|  | Price(s) | Corresponding size(s) |
|---|---|---|
| New TP Order to buy[a] | B | BS |
| Sell limit orders in the orderbook (from TP's) | $C_1, C_2, \ldots C_N$ where $C_1 <= C_2$ $<=$ etc.[b] | $CS_1, CS_2, \ldots$ $CS_N$ |
| The MARKET MAKER's current offer[c] | P | PS |
| The best offer on Designated Exchange ("DE") | D | DS |
| Size of one tick on the DE | T | |

[a]Price only applies if Order is a limit order. If a market order, all tests below involving B do not apply.
[b]Multiple $C_1$'s at the same price are sorted based on time priority.
[c]The procedures below are independent of the procedures by which MARKET MAKER's set their quotes. In practice, for example, MARKET MAKERs may choose to instruct the system to always set P = D.

Step 1, define US as the balance of the Order yet to be filled. Initially, therefore, US=BS Step 2, A "snapshot" is taken of D/DS, and is "frozen" in the order book together with the market maker's quote P/PS (even though in reality D/DS might change while the steps below are being executed). In other words the parameters are stored in the order book, while waiting for the processing of the steps below.

Step 3, Insert the market maker's offer P/PS into the sequence of $C_i$'s so the sequence remains sorted from lowest to highest, e.g. $C_1, C_2, C_3 \ldots P \ldots C_N$. Call this new series $O_1, O_2 \ldots O_M$ with corresponding sizes $OS_1, OS_2 \ldots OS_M$ Where offers are present from both TP(s) and the market maker at the same price, the TP offers are placed earlier in the sequence than the market maker offer. As a result, in the steps below the TP offers will be executed before the market maker offer.

Step 4, If the Order is a limit order and $O_1$>B, then reject it (if it is a fast order) or store it (if it is a limit order)

Step 5, Beginning with i=1, and continuing while US>0 and $O_i$<D,

If $O_1$>B, reject remainder (if fast order) or store (if limit order)

Else, trade Order at $O_1$
US=US−$OS_1$

Step 6. The status now is: US>0 and $O_1$=D

If D>B, reject remainder (if fast order) or store (if limit order)

Else, trade Order at D.
US=US−$OS_i$

Step 7. The status is now: US>0 and there are no further TP offers or market maker offer to trade against The market maker now has two options:

Trade max(0, DS−PS−BS+US) at a price of D and, if (D+T)<=B, max(0, BS—US−max(0, DS−PS−BS+US)) at a price of (D+T); OR Send a buy order to the DE for size US, as set out below under "Procedure for Sending an Order to the DE"

The system will know from the market maker's parameters whether to choose option (a) or (b). See below.

P/PS and D/DS are "unfrozen" after the trade in option (a) is complete, or before the order is sent to the DE in option (b). Based on the fills returned from the DE, reduce US accordingly Step 8, If US>0 after step #7, reject remainder (if a fast order) or store (if a limit order).

The following steps are preferably executed immediately upon receipt of any order and, if a limit order, even if the limit is "away" from the best bid in the order book.

If the Order has been stored in order book after step #7, the steps are re-executed as soon as the best offer in the system matches B.

Below a procedure for Sending an Order to the exchange is shown with reference to FIG. 3. It is not necessary to perform all steps. Some steps can be omitted if the user so desires.

In the example given here, it is assumed that the order sent to the designated exchange (DE) is to buy US number of shares.

Step 11. Take all of offers in the system>D but<=B, and sort them from lowest to highest, e.g. in the sequence $C_K$, $C_{K+1}, \ldots C_X$ with corresponding sizes $CS_K, CS_{K+1}, \ldots CS_X$ Step 12. If the market maker's current offer satisfies: D<P<=B;

Insert the market maker's current offer into the sequence of $C_i$'s so the sequence remains sorted from lowest to highest, e.g. $C_K, C_{K+1}, \ldots P \ldots C_X$. Call this new series $R_1, R_2 \ldots R_L$ with corresponding sizes $RS_1, RS_2 \ldots RS_L$.

Where offers are present from both TP(s) and the market maker at the same price, the TP offers are placed earlier in the sequence than the market maker offer. As a result, in the steps below the TP offers will be executed before the market maker offer.

Step 13. Define $NS_j = \Sigma RS_1$ (from i=1 to j with 1<=j<=L). Define M as the smallest j such that US<=$NS_j$; but US<$NS_{j+1}$ (with M=L if no such j exists)

Step 14. The offers $R_1/RS_1$ are "frozen" (stored) in the orderbook.

Step 15. The following orders are sent to the DE (in the sequence indicated):

If US>$NS_M$, buy (US−$NS_M$) shares at B (or at market if B not defined)

Buy (US−max(0, US−$NS_M$)−$NS_{M-1}$) shares at (R−T)

Buy $RS_{M-1}$ shares at ($R_{M-1}$−T)

Buy $RS_1$ shares at ($R_1$−T)

Once all of the fills in step #15 have been returned, reduce US based accordingly.

Step 16. Suppose that US is still>0. In its order book, the system then executes the following trades (in the sequence indicated):

Buy min(US, $RS_1$) shares at $R_1$. Reduce US by the quantity filled.

Buy min(US, $RS_2$) shares at $R_2$. Reduce US by the quantity filled.

Buy min(US, $RS_M$) shares at $R_M$. Reduce US by the quantity filled

Buy US shares at B (or market if B not defined). Reduce US by the quantity filled.

If the $R_i/RS_i$ have been frozen in step #14 above, all of the above orders are guaranteed to be filled (except the last one, which becomes irrelevant).

Step 17. All orders frozen in step #14 above, but not traded in step #16, are unfrozen and returned to the order book.

Figure 4:
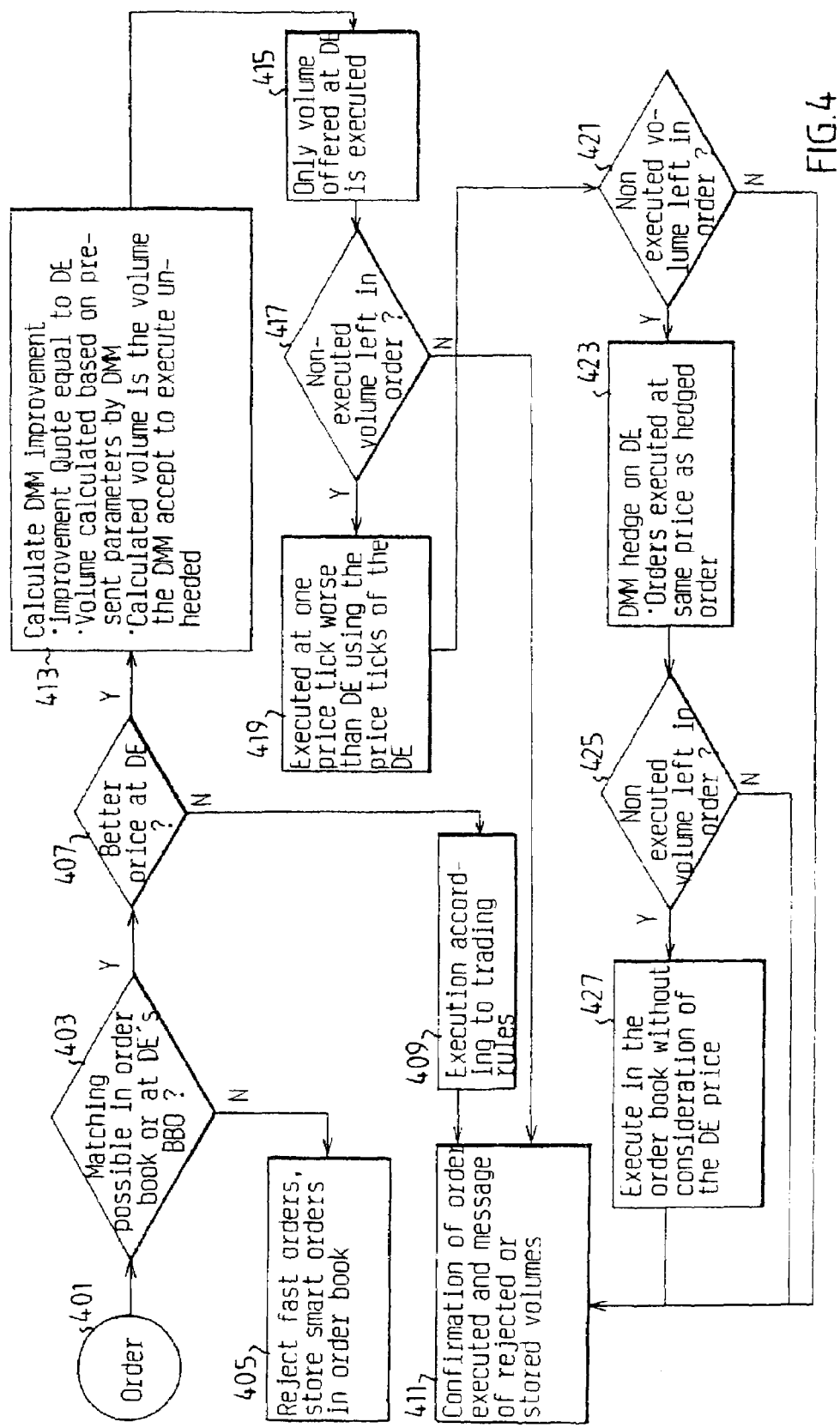
FIG. 4 is a flowchart illustrating matching steps carried out in an automated exchange.

In FIG. 4, an overview of the non-limiting, example matching algorithm described above is shown. Thus, first in a step 401 an order is received in the automated exchange. Next, it is checked if it is possible to match the order in the orderbook or at the Best Bid/Offer at a Designated Exchange, step 402. If not, fast orders are rejected and smart orders are stored in the orderbook, step 405. If matching is possible it is checked if there is a better price at a Designated Exchange, step 407.

If the price at a Designated Exchange is not better than in the orderbook, the order is executed in accordance with the trading rules of the automated exchange, step 409 and the execution is confirmed, step 411.

If the price is better at a Designated Exchange, the automated exchange calculates the market makers improvement quote as described above; step 413. However, only the volume offered at the designated exchange offering a better price is executed, step 415.

Next, it is checked if there is any non-executed volume left of the order, step 417. If not, the execution is confirmed in step 411. If there is non-executed volume left, the remaining volume is executed at one price tick worse using the price ticks of the designated exchange, step 419.

Next it is checked if there is any non-executed volume left of the order, step 421. If not, the execution is confirmed in step 411. If there is non-executed volume left, an automatic hedge order is sent to the designated exchange and the order is executed at the same price as the hedge order, step 423 as described above.

Next it is checked if there is any non-executed volume left of the order, step 425. If not, the execution is confirmed in step 411. If there is non-executed volume left, the remainder of the order volume is executed in the orderbook of the automated exchange only, step 427, and the execution is confirmed in step 411.

By using the price improvement quote in an automated exchange as described above, the market maker does not need to re-quote when the market moves. The price is instead set by a reference to another execution point, such as another exchange or similar.

The automatic hedging procedure described above makes it possible to create many hedge orders, which can be sent to a designated exchange in order to protect orders in the exchange to which the market maker sends quotes. The advantage with such a system, as compared with, for example, the system described In the International patent application PCT/SE99/01995 is that orders within the order book at the designated exchange can be matched if orders can not be executed at the exchange.

The invention claimed is:

1. A method for use in an automated trading system, where a market maker is responsible for providing in a first computer-based exchange a buy price and a sell price to trade a financial instrument and where a difference between the buy price and the sell price defines a spread for the financial instrument, comprising the following steps implemented at the first computer-based exchange:

receiving a quote comprising a volume and a price associated with the buying and/or selling of the financial instrument that requires an improved buy price and/or sell price for trading the financial instrument relative to the buy price and/or sell price for trading the financial instrument offered in the first computer-based exchange; and automatically using a current buy price and/or a current sell price for the financial instrument obtained from a second computer-based exchange to execute the quote of the financial instrument at the improved buy price and/or sell price at the first computer-based exchange, wherein the quote further includes a multiplier parameter for controlling a volume of the quote by multiplying the multiplier parameter with a volume at the second computer-based exchange.

2. The method according to claim 1, wherein the multiplier parameter is used to control a risk for the market maker with respect to the volume associated with the quote.

3. The method according to claim 1, wherein the quote further includes a volume limit parameter for controlling a risk for the market maker with respect to the volume associated with the quote.

4. The method in claim 1, wherein the improved price is a either a higher buy price if the quote is a buy order or a lower sell price if the quote is a sell order.

5. The method in claim 1, further comprising:

determining that a remainder of an incoming order cannot be filled at the first computer-based exchange;

automatically obtaining additional volume of the financial instrument from the second computer-based exchange; and executing some or all of the remainder of the incoming order at the first computer-based exchange using the additional volume of the financial instrument obtained from the second computer-based exchange.

6. The method in claim 5, wherein the execution of some or all of the remainder of the incoming order at the first computer-based exchange using the additional volume of the financial instrument obtained from the second computer-based exchange is at the improved buy price and/or sell price.

7. The method in claim 6, further comprising:

determining that only some of the remainder of the incoming order can be filled using the additional volume of the financial instrument obtained from the second computer-based exchange, and executing a non-executed portion of the trade order at the first computer-based exchange without consideration of the improved buy price and/or sell price.

8. The method in claim 5, wherein in order to transfer the additional volume of the financial instrument from the second computer-based exchange to the first computer-based exchange, the first computer-based exchange performs the following steps:

sending a transfer order to the market maker requesting the market maker execute that transfer order at the second computer-based exchange;

receiving from the market maker the additional volume of the financial instrument obtained as a result of the market maker executing the transfer order at the second computer-based exchange; and executing some or all of the remainder of the trade order at the first computer-based exchange using the additional volume of the financial instrument obtained from the second computer-based exchange and received from the market maker.

9. Apparatus for use in an automated trading system, where a market maker is responsible for providing in a first computer-based exchange a buy price and a sell price to trade a financial instrument and where a difference between the buy price and the sell price defines a spread for the financial instrument, comprising electronic circuitry at the first computer-based exchange programmably configured to:

receive a quote comprising a volume and a price associated with the buying and/or selling of the financial instrument that requires an improved buy price and/or sell price for trading the financial instrument relative to the buy price and/or sell price for trading the financial instrument offered in the first computer-based exchange; and automatically use a current buy price and/or a current sell price for the financial instrument obtained from a second computer-based exchange to execute the quote of the financial instrument at the improved buy price and/or sell price at the first computer-based exchange, wherein the quote further includes a multiplier parameter for controlling a volume of the quote by multiplying the multiplier parameter with a volume at the second computer-based exchange.

10. The apparatus according to claim 9, wherein the multiplier parameter is used to control a risk for the market maker with respect to the volume associated with the quote.

11. The apparatus according to claim 9, wherein the quote further includes a volume limit parameter for controlling a risk for the market maker with respect to the volume associated with the quote.

12. The apparatus according to claim 9, wherein the improved price is a either a higher buy price if the quote is a buy order or a lower sell price if the quote is a sell order.

13. The apparatus according to claim 9, wherein the electronic circuitry at the first computer-based exchange is further configured to:

determine that a remainder of an incoming order cannot be filled at the first computer-based exchange;

automatically obtain additional volume of the financial instrument from the second computer-based exchange; and execute some or all of the remainder of the incoming order at the first computer-based exchange using the additional volume of the financial instrument obtained from the second computer-based exchange.

14. The apparatus according to claim 13, wherein the electronic circuitry at the first computer-based exchange is further configured to execute some or all of the remainder of the incoming order at the first computer-based exchange using the additional volume of the financial instrument obtained from the second computer-based exchange at the improved buy price and/or sell price.

15. The apparatus according to claim 14, wherein the electronic circuitry at the first computer-based exchange is further configured to:

determine that only some of the remainder of the incoming order can be filled using the additional volume of the financial instrument obtained from the second computer-based exchange, and execute a non-executed portion of the trade order at the first computer-based exchange without consideration of the improved buy price and/or sell price.

16. The apparatus according to claim 13, wherein in order to transfer the additional volume of the financial instrument from the second computer-based exchange to the first computer-based exchange, the electronic circuitry at the first computer-based exchange is further configured to:

send a transfer order to the market maker requesting the market maker execute that transfer order at the second computer-based exchange;

receive from the market maker the additional volume of the financial instrument obtained as a result of the market maker executing the transfer order at the second computer-based exchange; and execute some or all of the remainder of the trade order at the first computer-based exchange using the additional volume of the financial instrument obtained from the second computer-based exchange and received from the market maker.

17. A computer program for use in an automated trading system, where a market maker is responsible for providing in a first computer-based exchange a buy price and a sell price to trade a financial instrument and where a difference between the buy price and the sell price defines a spread for the financial instrument, wherein the computer program includes program code provided in a computer-readable medium for controlling a computer, comprising program code configured to:

receive a quote comprising a volume and a price associated with the buying and/or selling of the financial instrument that requires an improved buy price and/or sell price for trading the financial instrument relative to the buy price and/or sell price for trading the financial instrument offered in the first computer-based exchange; and automatically use a current buy price and/or a current sell price for the financial instrument obtained from a second computer-based exchange to execute the quote of the financial instrument at the improved buy price and/or sell price at the first computer-based exchange, wherein the quote further includes a multiplier parameter for controlling a volume of the quote by multiplying the multiplier parameter with a volume at the second computer-based exchange.

18. The computer program according to claim 17, wherein the multiplier parameter is used to control a risk for the market maker with respect to the volume associated with the quote.

19. The computer program according to claim 17, wherein the quote further includes a volume limit parameter for controlling a risk for the market maker with respect to the volume associated with the quote.

20. The computer program according to claim 17, wherein the improved price is a either a higher buy price if the quote is a buy order or a lower sell price if the quote is a sell order.

21. The computer program according to claim 17, wherein the program code is further configured to:

determine that a remainder of an incoming order cannot be filled at the first computer-based exchange;

automatically obtain additional volume of the financial instrument from the second computer-based exchange; and execute some or all of the remainder of the incoming order at the first computer-based exchange using the additional volume of the financial instrument obtained from the second computer-based exchange.

22. The computer program according to claim 21, wherein the program code is further configured to execute some or all of the remainder of the incoming order at the first computer-based exchange using the additional volume of the financial instrument obtained from the second computer-based exchange at the improved buy price and/or sell price.

23. The computer program according to claim 22, wherein the program code is further configured to:

determine that only some of the remainder of the incoming order can be filled using the additional volume of the financial instrument obtained from the second computer-based exchange, and execute a non-executed portion of the trade order at the first computer-based exchange without consideration of the improved buy price and/or sell price.

24. The computer program according to claim 21, wherein in order to transfer the additional volume of the financial instrument from the second computer-based exchange to the first computer-based exchange, the program code is further configured to:

send a transfer order to the market maker requesting the market maker execute that transfer order at the second computer-based exchange;

receive from the market maker the additional volume of the financial instrument obtained as a result of the market maker executing the transfer order at the second computer-based exchange; and execute some or all of the remainder of the trade order at the first computer-based exchange using the additional volume of the financial instrument obtained from the second computer-based exchange and received from the market maker.

* * * * *